United States Patent [19]

Herter

[11] Patent Number: 4,547,227
[45] Date of Patent: Oct. 15, 1985

[54] METHOD FOR PREPARING A STEEL CHARGE FROM TERNEPLATE SCRAP METAL

[76] Inventor: Carl J. Herter, 1638 Walnut St., Allentown, Pa. 18102

[21] Appl. No.: 598,445

[22] Filed: Apr. 9, 1984

[51] Int. Cl.⁴ .............................................. B08B 7/04
[52] U.S. Cl. ........................................ 134/7; 51/323; 134/12; 134/18; 134/25.1; 134/25.5; 134/29; 134/30; 134/40
[58] Field of Search ............... 134/7, 12, 18, 19, 25.1, 134/25.5, 29, 30, 40; 51/319, 323

[56] References Cited

U.S. PATENT DOCUMENTS

| | | | |
|---|---|---|---|
| 1,403,727 | 1/1922 | Zabel et al. | 51/323 X |
| 1,580,723 | 4/1926 | Hapgood | 134/40 X |
| 1,743,466 | 1/1930 | Maag et al. | 134/40 X |
| 2,158,063 | 5/1939 | Broadfield | 51/323 X |
| 2,254,492 | 9/1941 | Orozco | 134/40 X |
| 3,163,929 | 1/1965 | Goodstein | 134/40 X |
| 3,544,369 | 12/1970 | Keogh | 134/25.5 X |
| 3,734,776 | 5/1973 | Keogh | 134/40 X |
| 3,846,173 | 11/1974 | Ihrig | 134/40 X |
| 4,097,306 | 6/1978 | Carman | 134/40 X |

Primary Examiner—Marc L. Caroff
Attorney, Agent, or Firm—Ruth Moyerman

[57] ABSTRACT

A process is disclosed for treating terneplate scrap contaminated with combustibles, such as found in automobile gas tanks, to reduce the alloy content of the scrap to a sufficient level to permit the scrap to be reprocessed in an electric furnace. In the process, the contaminated terneplate metal is introduced into the feed end of a degreaser maintained at about 200 degrees F. by live steam. The degreaser includes a cutting device for downsizing the metal scrap and a vaporized caustic spray, combining with the live steam, to emulsify the residual combustibles. The metal feed exits the degreaser and is dryed while the vaporized emulsion is advanced to a condensor and separator for recycling the caustic to the degreaser and the hydrocarbons to storage. After drying, the metal feed is introduced into a glass bead blaster which removes the lead and tin from the metal feed, thereby leaving a scrap metal feed with a lead and tin percent sufficiently low to be suitable for use as a charge in a steel making furnace.

17 Claims, 1 Drawing Figure

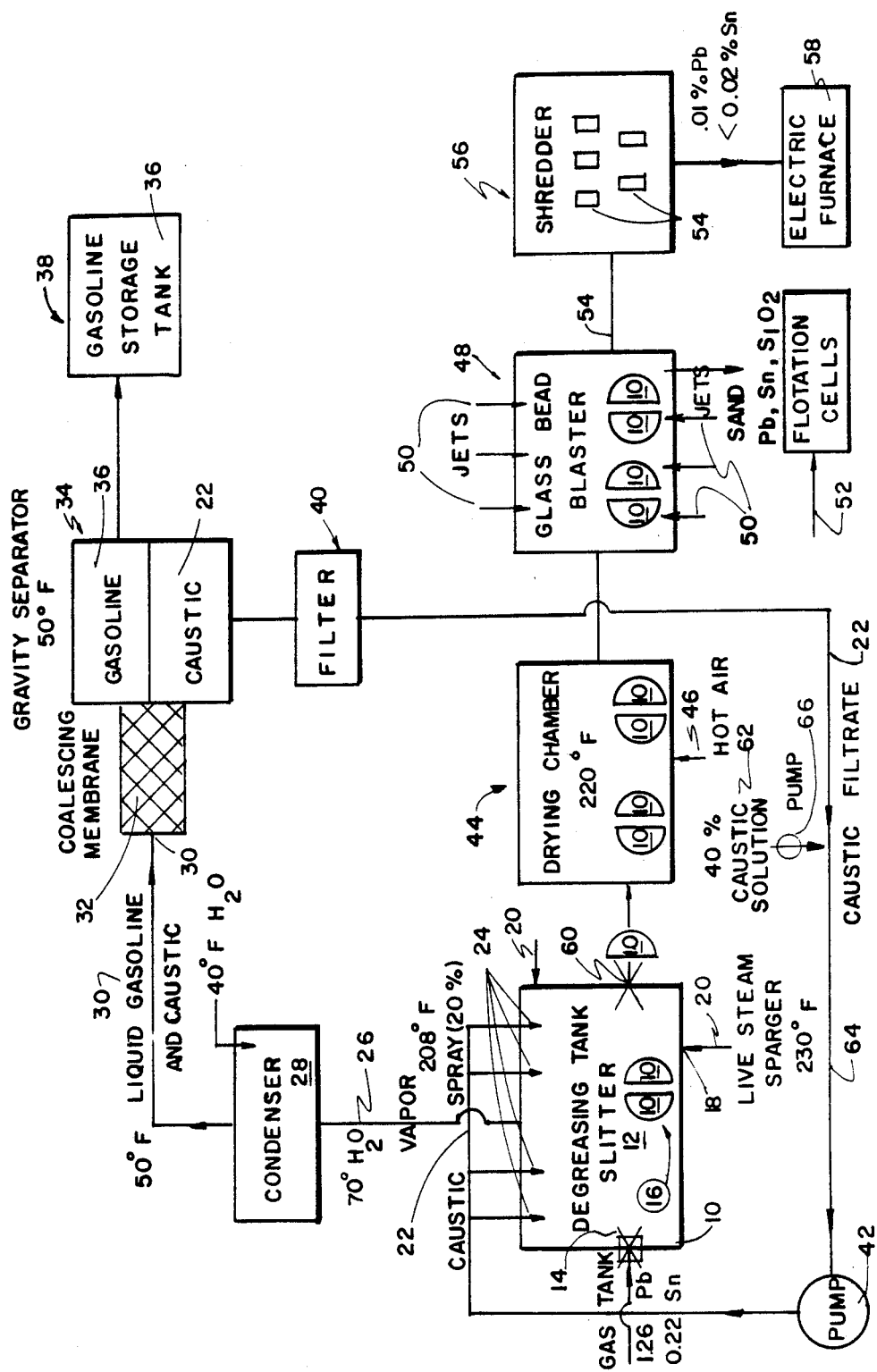

METHOD FOR PREPARING A STEEL CHARGE FROM TERNEPLATE SCRAP METAL

BACKGROUND OF THE INVENTION

1. Field of the Invention

This invention relates to a metalurgy, and more particularly to iron and steel recovery from scrap metal.

2. Description of the Prior Art

Derelict or abandoned automobiles whose whole or parts are rendered useless are causing a major disposal problem. While various recycling methods are known for most metal parts of the automobile, heretofore, no safe method has yet been devised to recycle a used automobile gas tank for its metal value. Also, there is no known method to also recover volatile hydrocarbons which are contained within the tank shell. The conventional method of gas tank disposal is merely to bury the abandoned tank, thereby rendering the used gas tank a complete loss or waste.

Some prior art is known. Rhinehart, in U.S. Pat. No. 4,014,681, discloses an energy recycling process to be used with automobile scrap. In the Rhinehart process, a totally stripped vehicle body—that is, one stripped of alternators, radiators, generators, starters, voltage regulators, transmissions, carburetors, glass, etc.—is moved by conveyor into a more or less open cupola where it is melted. Carbon electrodes are required to generate the necessary 3,200 degree F. temperature. The thrust of this patent is the use of heat generated in recycling to, for example, preheat the charge. The charge is drawn off molten, in layers if possible. All hot gases are removed as exhaust and discharged into the atmosphere.

Evans et al, in U.S. Pat. No. 4,200,262, discloses a method and apparatus for removing combustible material from metal scrap. Evans characterizes his apparatus as a rotating retort and its use is for burning combustibles such as oil from scrap metal such as turnings, chips, shearings, punchings, and other similar materials which tend to include a coating of oil which must be removed before reclaiming. In the Evans apparatus, temperatures of 50 to 500 degrees F. are used in an oxidizing atmosphere through which the material moves, conveyed forward by the rotating retort. Evans uses a flame to burn the combustibles that are not recovered.

None of these references deal with a high alloy scrap which removes the alloys in a nonmolten atmosphere. Many prior art solutions are totally noneconomical because of high energy demands of the process as would be needed for the high temperatures utilized in, for example, Rhinehart. Furthermore, none of these references address themselves to the recycling or recovery of an automobile gas tank and its residual volatile hydrocarbons.

SUMMARY OF THE INVENTION

The prior art problems are solved by the process of this invention wherein contaminated terneplate metal, such as vehicular gas tanks, is introduced into the feed end of a degreaser maintained at about 200 degrees F. by a live steam sparger. The degreaser includes an internal cutting device for downsizing the metal scrap, and a vaporized caustic spray, combining with live steam, to emulsify the residual combustibles. The emulsion is then separated into hydrocarbons and caustic. The hydrocarbons are advanced to storage and the caustic is returned for use in the degreaser.

The metal feed exits the degreaser and is received by an air drying chamber. Thereafter, the metal feed is introduced into a glass bead blaster which removes the lead and tin from the metal feed, thereby leaving a scrap metal feed with a lead and tin percent sufficiently low to be suitable for use as a charge in a steel making furnace.

It is, therefore, an object of this invention to provide a safe, flameless recovery of used gas tanks and their volatile hydrocarbons.

It is also an object of this invention to provide a recovery and recycling process which is ecologically advantageous as, previously, the waste product was disposed of through burying.

It is another object of this invention to provide a new means of degreasing by using caustic spray rather than the conventional detergent.

These and other objects will be more readily ascertainable to one skilled in the art from a consideration of the following Figures, description and exemplary embodiments.

BRIEF DESCRIPTION OF THE DRAWING(S)

The drawing illustrates a flow chart of the process of this invention.

DETAILED DESCRIPTION OF THE PREFERRED EMBODIMENT(S)

Referring now to the flow chart drawing, gas tank 10 containing about 1.26% lead and about 0.22% tin and residual combustibles, enters degreaser 12 through star valve 14. Compartmentalized star valve 14 prevents the escaping of any combustibles. Gas tank 10 is then downsized into at least two parts by diamond saw 16, thereby exposing both the inner and outer surface of gas tank 10.

Live steam 20, maintained at about 230 degrees F., enters degreaser 12 at sparger 18. Caustic spray 22, as sodium hydroxide, maintained at about 20% caustic, enters degreaser 12 at points indicated by 24. The spray solution of steam 20 and caustic 22 causes the volatile hydrocarbons associated with gas tank 10 to emulsify into a vapor of about 5% gasoline.

Gasoline caustic vapors 26, now at about 208 degrees F., proceeds into condenser 28 which has a beginning cooling water temperature of preferably about 40 degrees F. and an exit temperature of preferably about 70 degrees F. A suction pump is suitable for this purpose. The action of condenser 28 causes the vapor to liquify. Condenser 28 may be a conventional shell tube heat exchanger.

Liquid gasoline caustic 30, now at about 50 degrees F. to maintain the solubility of the gasoline, is fed through coalescing membrane 32 which enlarges size of droplets as it passes through restrictions within coalescing membrane 32, and can separate solutions with a difference of 0.05 specific gravity as it passes coalescing membrane 32. Coalescing membrane 32 is a conventional membrane and may be a Selas coalescing membrane. Liquid gasoline caustic 30 is passed through coalescing membrane 32 to a conventional gravity separator 34 such as a Selas separator. Selas brand products are manufactured by Selas Corp. of America, Philadelphia, PA. Here, by difference in specific gravity, gasoline 36 with a specific gravity of 0.8 is separated from caustic 22 with a specific gravity of 1.1.

Gasoline 36 is advanced to storage tank 38 and is now available for further use. Caustic 22, now in a sludge form, proceeds to earth filter 40, such as a diamateous earth filter. After the filtering process at 40, filtered caustic 22 is recycled back to pump 42 which, in turn, relays it back to caustic spray inlets 24 for re-use. Pump 42 is preferably a centrifugal pump. Additional 40% caustic solution 62 is metered into filtrate line 64 through position displacement pump 66 to maintain the caustic solution at 20% caustic.

As split gas tank 10 is now cleansed of its volatile hydrocarbons, it proceeds out of degreasing chamber 12, through star valve 60 and into drying chamber 44 maintained at about 220 degrees F. by heated air 46. Star valve 60 prevents the escape of any combustibles. Split gas tank 10, after drying, is then fed to glass bead blaster 48. Jets of glass beads, as indicated at 50, are activated to blast lead-tin alloy from the base steel of gasoline tank 10. Gas tank 10, as it enters blaster 48, contains about 1.26% lead and about 0.22% tin. After the cleaning of tank 10 by glass jets 50, tank 10 contains about 0.01% lead and less than 0.02% tin. That is a 99.2% removal of lead and a 91% removal of tin, thereby leaving scrap metal feed 54, suitable for use as a charge in a steel making furnace.

Scrap metal feed 54 then proceeds to shredder 56 where it is reduced in size. Generally a 4×0 mesh is satisfactory as charge material. Scrap metal feed 54 is then advanced to furnace 58 as a charge. The glass beads, lead and tin material exits blass bead blaster 48 and is sent to flotation cells 52 for the recovery of lead and tin.

The movement of gas tank 10 through the various processes may be by conveyor belt or any other acceptable means.

There are many variations which may be practiced within the scope of this invention. For example, wherein we have discussed the method in relation to used gas tanks, metal recovery of a like alloy would still be applicable, such as tin coated or zinc coated metals.

While a 20% caustic solution is stated, it is merely preferable, and any combination that would accomplish the objective of emulsion may still be within the scope of this invention.

While a star valve is indicated, any manner of tank entrance and exit may be used and still be within the scope of this invention as long as volatile gases are not allowed to escape.

While reducing the scrap to a 4×0 mesh is preferred for ease of handling, it is not critical to the scope of this invention.

While a diamond saw is indicated for means of slitting the gas tank, other means may be used and still be within the scope of this invention.

Further, while a preferred glass bead size is within 1/16" to 1/32" range, those limitations are not critical and any size that would accomplish the cleaning will still be within the scope of this invention.

The method of this invention has many advantages. Chiefly among these is that the steam and caustic act as a flame arrestor to prevent any explosions from volatile hydrocarbons.

Secondly, use of the star valve prevents fumes from releasing into the atmosphere and causing explosive conditions.

Third, the drying of the tank through the hot air chamber prevents the forming of a mortar type mix that would, in turn, plug the glass bead blaster jets.

Fourth, the steam heat sparger allows for a uniform distribution of the live steam.

Fifth, glass beads jets are preferable over sand jets as the sand would, through its uneven surface, only further impregnate the gas tank, whereas the roundness of the glass beads will not impregnate the tank, but cause the lead and tin to flake off as desired.

Lastly, the recovery of the emulsified material makes for a more economic operation and eliminates a potential polution problem.

Having now described and illustrated my invention, it is not intended that such description be limiting, but rather that the invention be limited only by a reasonable interpretation of the appended claims.

What is claimed is:

1. A method of preparing a low residual alloy material for steel charge from terneplate scrap metal contaminated with combustibles comprising:
    (a) introducing said contaminated terneplate scrap metal feed into a feed end of a degreaser, maintaining said degreaser at about 200 degrees F. by introducing live steam therein, down sizing said metal scrap with a cutting means in said degreaser, emulsifying said residual combustibles including volatile hydrocarbons from said metal feed by contacting said metal feed with a vaporized caustic spray combined with said live steam in said degreaser to thereby cleanse said feed;
    (b) separating said metal feed from said emulsion;
    (c) drying said metal feed; and,
    (d) introducing said dried feed into a blast chamber wherein said dried feed is contacted with jets of glass beads to remove lead and tin from said feed and thereby produce a sand of glass, lead and tin and further leaving said scrap metal feed with a lead and tin content sufficiently low to be suitable for use as a charge in a steel making furnace.

2. The method according to claim 1 wherein said scrap is introduced to said degreaser of part (a) through a star valve.

3. The method according to claim 1 wherein said metal feed is withdrawn from said degreaser through a star valve.

4. The method according to claim 1 wherein said cutting means of part (a) is a diamond saw.

5. The method according to claim 1 wherein said vaporized emulsion of said residual hydrocarbons, spent caustic and spent steam is removed from said degreaser by suction pump and further liquified.

6. The method according to claim 5 wherein said liquifying of said hydrocarbons and said caustic is performed in a shell tube heat exchanger with a water entrance temperature of about 40 degrees F. and an exit temperature of about 70 degrees F.

7. The method according to claim 5 wherein said liquified hydrocarbons and said caustic are separated by coalescing membrane chamber means maintained at about 50 degrees F.

8. The method according to claim 7 wherein said hydrocarbons are recovered and said caustic is then recycled back to said degreaser.

9. The method according to claim 1 wherein said drying of said metal feed of part (c) is performed by contacting said feed with heated air.

10. The method according to claim 1 wherein said sand of part (d) is removed from said blast chamber and separated into components of glass, tin and lead by means of flotation cells.

11. The method according to claim 1 wherein said scrap metal feed of part (d) is further reduced to about a 4×0 mesh size by shredding.

12. The method according to claim 1 wherein said glass beads of part (d) are sized from about 1/16" to about 1/32".

13. The method according to claim 1 wherein said caustic spray of part (a) is about a 20% solution of sodium hydroxide.

14. The method according to claim 1 wherein said contaminated terneplate of part (a) contains about 1.26% lead and about 0.22% tin.

15. The method according to claim 1 wherein said scrap metal feed of part (d) contains about 0.01% lead and less than 0.02% tin.

16. A method of preparing a low residual alloy material for steel charge from terneplate scrap metal contaminated with combustibles comprising:
  (a) introducing said contaminated terneplate scrap metal feed into a feed end of a degreaser, maintaining said degreaser at about 200 degrees F. by introducing live steam therein, downsizing said metal scrap with a cutting means in said degreaser, emulsifying said residual combustibles including volatile hydrocarbons from said metal feed by contacting said metal feed with a vaporized caustic spray combined with said live steam in said degreaser to cleanse thereby said feed;
  (b) separating said emulsion into said hydrocarbons and said caustic;
  (c) returning said caustic to said degreaser and advancing said hydrocarbons to storage means;
  (d) separating said metal feed from said emulsion;
  (e) drying said metal feed; and,
  (f) introducing said dried feed into a blast chamber wherein said dried feed is contacted with jets of glass beads to remove lead and tin from said feed and thereby produce a sand of glass, lead and tin and further leaving said scrap metal feed with a lead and tin content sufficiently low to be suitable for use as a charge in a steel making furnace.

17. The method according to claim 1 wherein said terneplate feed is derived from scrap vehicle gas tanks.

* * * * *